United States Patent
Daus et al.

(10) Patent No.: US 6,761,600 B2
(45) Date of Patent: Jul. 13, 2004

(54) MARINE GEAR AND A METHOD FOR PREVENTING A DROP IN MOTOR SPEED WHEN ENGAGING A MULTI-PLATE CLUTCH

(75) Inventors: Jürgen Daus, Hehlen (DE); Hans-Harald Lux, Halle (DE)

(73) Assignee: Reintjes GmbH, Hameln (DE)

( * ) Notice: Subject to any disclaimer, the term of this patent is extended or adjusted under 35 U.S.C. 154(b) by 0 days.

(21) Appl. No.: 10/239,273

(22) PCT Filed: Mar. 26, 2001

(86) PCT No.: PCT/DE01/01142

§ 371 (c)(1),
(2), (4) Date: Sep. 20, 2002

(87) PCT Pub. No.: WO01/72586

PCT Pub. Date: Oct. 4, 2001

(65) Prior Publication Data

US 2003/0049979 A1 Mar. 13, 2003

(30) Foreign Application Priority Data

Mar. 27, 2000 (DE) .......................................... 100 14 768

(51) Int. Cl.⁷ .............................................. B63H 20/14
(52) U.S. Cl. ................. 440/75; 192/85 AA; 192/103 R
(58) Field of Search .............................. 440/75; 192/51, 192/85 AA, 103 R

(56) References Cited

U.S. PATENT DOCUMENTS

| | | | | |
|---|---|---|---|---|
| 3,437,188 A | * | 4/1969 | Long ....................... | 192/103 R |
| 3,653,476 A | * | 4/1972 | Allen et al. ............... | 192/87.19 |
| 3,752,280 A | * | 8/1973 | Cheek .................... | 192/85 AA |
| 3,823,801 A | * | 7/1974 | Arnold .................... | 192/87.19 |
| 3,922,997 A | * | 12/1975 | Jameson ..................... | 440/75 |
| 4,186,829 A | * | 2/1980 | Schneider et al. ...... | 192/85 AA |
| 4,253,414 A | | 3/1981 | Schafer ....................... | 440/84 |
| 5,664,978 A | * | 9/1997 | Howe .......................... | 440/75 |
| 5,967,285 A | * | 10/1999 | Mohan et al. .......... | 192/85 AA |
| 6,419,067 B1 | * | 7/2002 | Fischer .................. | 192/85 AA |
| 6,443,286 B1 | * | 9/2002 | Bratel et al. ............ | 192/85 AA |

FOREIGN PATENT DOCUMENTS

| | | |
|---|---|---|
| DE | 35 05 992 | 8/1986 |
| DE | 40 19 687 | 12/1991 |
| JP | 60 256629 | 12/1985 |
| JP | 61 135899 | 6/1986 |
| JP | 10 278890 | 10/1998 |

OTHER PUBLICATIONS

Goodbar J. E. et al. (1986) "The Design and Development of a Four Speed Powershift Transmission with Electronic Clutch Pressure Modulation", SAE Technical Paper Series, Society of Automotive Engineers, pp. 1–12.

* cited by examiner

Primary Examiner—S. Joseph Morano
Assistant Examiner—Larsa Olson
(74) Attorney, Agent, or Firm—Collard & Roe, P.C.

(57) ABSTRACT

The invention relates to a marine gear, in particular to a reversing gear, consisting of a hydraulic control assembly comprising variable multi-plate clutches for forwards and reverse travel, in which the operating pressure required to engage the multi-plate clutches can be set using control means and consisting of an electronic control unit for detecting and processing at least one operating parameter and for operating the control means. The control means comprise a proportional valve and a pilot-operated pressure-control valve for setting the desired operating pressure, which is located on the pressure-oil line that leads to the multi-plate clutch. The proportional valve can be controlled by an electric control current of the electronic control unit and the pressure control valve can be actuated by a control pressure that is generated by the proportional valve. The electronic control unit is connected to a sensor for detecting the motor.

15 Claims, 6 Drawing Sheets

MARINE GEAR AND A METHOD FOR PREVENTING A DROP IN MOTOR SPEED WHEN ENGAGING A MULTI-PLATE CLUTCH

CROSS REFERENCE TO RELATED APPLICATIONS

Applicants claim priority under 35 U.S.C. §119 of German Application No. 100 14 768.2 filed Mar. 27, 2000. Applicants also claim priority under 35 U.S.C. §365 of PCT/DE01/01142 filed Mar. 26, 2001. The international application under PCT article 21(2) was not published in English.

BACKGROUND OF THE INVENTION

The invention relates to a marine gear and a method for preventing a drop in motor speed when engaging a multi-plate clutch of a marine gear.

Marine gear assemblies are known which are arranged between a motor, in particular a diesel motor, and a propeller, which marine gear assemblies comprise hydraulically controllable and selectively activatable multi-plate forward and reverse clutches.

A multi-plate clutch comprises several multi-plate discs of which a first number engages the drive shaft of the motor, while a second number engages the drive shaft or driven shaft of the propeller.

In this arrangement, which comprises several multi-plate discs arranged side by side, alternately one engages the drive shaft of the motor, while the adjacent multi-plate disc engages the driven shaft of the propeller.

In order to engage the multi-plate clutch, the multi-plate discs are pressed against each other by means of specified clutch oil pressure. During such engagement of the multi-plate clutch, the diesel motor operates at partial load until such time as the clutch engagement process is completed, in other words until all multi-plate discs of the multi-plate clutch have been pressed against each other. This can take five seconds or more.

The clutch oil pressure is also referred to as gear change pressure or operating pressure.

Operating pressure build-up takes place according to a so-called pressure build-up curve. The operating pressure is not built up quickly with a steep pressure build-up curve and a possible overswing, but instead, it is built up more slowly so as to be gentle on the diesel motor and the entire drive assembly.

The diesel motor cannot cope with clutch engagement that is too rapid, because the output during partial load operation of the diesel motor is not adequate for this. Rapid engagement of the clutch results in an undesirable drop in motor speed, and in extreme cases, in the motor stalling.

Until now, a pressure build-up curve according to which the clutch oil pressure required for pressing together the multi-plate discs, has been specified theoretically by trial-and-error and in experiments, taking into account existing conditions such as motor output, gyrating mass of the motor, etc.

Once this pressure build-up curve has been determined and set, it is always retained without any changes, irrespective of external factors and parameters.

To disengage the multi-plate clutch, the operating pressure is switched off and the multi-plate discs are relieved by a set spring pressure of a readjusting spring.

It is known to reduce the clutch oil pressure to the extent that a targeted slipping process of the multi-plates is maintained.

With constant motor speed, the propeller speed can be influenced via a slipping multi-plate clutch. This is useful in those cases where at a constant gear transmission the ship's speed is still too high at the lowest motor speed. The propeller speed can then be reduced by slippage of the multi-plates. Such an operating state of the marine gear is referred to as a trolling operation.

For this purpose a pressure-control valve is usually arranged in the pressure-oil line which leads to the multi-plate clutch, with a desired operating pressure being able to be set via said pressure-control valve. If the operating pressure is not at maximum, the multi-plate clutch slips.

From DE 40 19 687 A1, a marine gear is known in which for this purpose a directional control valve is arranged between the pressure-control valve and the multi-plate clutch. In a first operating position of the directional control valve, the operating pressure required for trolling operation is established in the pressure-oil line. By contrast, in a second operating position, the maximum operating pressure required for complete engagement of the multi-plate clutch is established. The directional control valve is hydraulically moved, at a certain minimum control pressure, to the first operating position by the pressure-control valve. Reaching this minimum control pressure depends on the setting of the pressure-control valve. The pressure-control valve is for example a proportional valve which is electrically connected to an electronic control unit. The electronic control unit in turn is connected to a speed sensor with which the present rotational speed of the motor shaft can be detected. A setpoint value or command value can be set at the electronic control unit, with the pressure-reduction valve being operated if said set-point value is exceeded.

With this so-called trolling operation, too, a pressure build-up curve according to which the operating pressure for slipping the multi-plate discs is built up, is theoretically specified by trial and error. Once this pressure build-up curve for trolling operation has been determined and set, it is always retained without any changes. The electronic control unit is only used to monitor the motor speed so that it keeps within a specified range.

SUMMARY

It is the object of the invention to improve a generic marine gear and a method for engaging the multi-plate clutch of a generic marine gear such that a drop in motor speed when engaging the multi-plate clutch is counteracted.

This object is met by a marine gear, and by a method for preventing a drop in motor speed when engaging a multi-plate clutch.

Improvements to, and advantageous embodiments of, the invention are set out in the respective subordinate claims.

The generic marine gear comprises a hydraulic control assembly and an electronic control unit. The hydraulic control assembly comprises variable multi-plate clutches for forward and reverse travel, in which the operating pressure required to engage the multi-plate clutches can be set using control means, depending on selectable parameters. The electronic control unit is used to detect and process at least one operating parameter as well as operating the control means.

According to the invention, the generic marine gear is characterised in that the control means comprises a proportional valve and a pilot-operated pressure-control valve which is located on the pressure-oil line that leads to the multi-plate clutch, for setting the desired operating pressure. The proportional valve can be operated by an electrical control current from the electronic control unit. The pressure control valve can be actuated by a control pressure that is generated by the proportional valve. The electronic control unit is connected to a sensor for detecting the motor speed and/or to a sensor for detecting the load signal of the motor.

The load signal, which is known among those skilled in the art, generally refers to the workload of the motor or the respective power/the respective performance characteristic of the motor.

The invention takes advantage of the fact that manufacturers of marine engines add so-called motor management systems to the respective marine motors, with the load signal being obtained on the basis of said motor management system. The motor management system is used to set the motor speed. If more fuel is added at a higher speed, then the motor also needs more air. All this is organised by the motor management system. The load signal is for example present in the form of a measured variable as a current ranging from 0–200 mA.

A combinatorial arrangement comprising a pilot-operated pressure-control valve and a proportional valve which can be actuated electrically makes it possible to directly transform an electrical control current supplied to the proportional valve by the electronic control unit, into an operating pressure.

In this arrangement, the current operating pressure is proportional to the control pressure present at the control connection of the pressure-control valve.

According to the invention, the control pressure can be set by way of the proportional valve which in turn can be operated by the electronic control unit by way of an electrical control current in direct dependence on the change in motor speed and/or change in the load signal of the motor.

In a marine gear according to the invention, designed in this way, it is possible during the engagement process of the multi-plate clutch, to electrically control the gradient of the operating pressure over time. According to the invention, the pressure build-up is not determined theoretically and rigidly maintained thereafter, but instead is dynamically controlled depending on the change in engine speed and/or in the load signal of the motor. During each gear change procedure, the pressure build-up for engaging the multi-plate clutch is matched anew to the conditions prevailing at the time.

Thus, in contrast to the situation with the state of the art, the pressure build-up curve according to the invention does not maintain the same rigid gradient, but instead is set anew with each individual clutch procedure. In this way, different pressure build-up curves can arise.

By way of pressure build-up matched in this way, it is possible to counteract a drop in motor speed caused when engaging the clutch.

An improvement of the invention provides for the proportional valve to generate a hydraulic control pressure which is inversely proportional to the electrical control current.

Conventional proportional valves generate a hydraulic pressure which is proportional to the electrical control current. The greater the control current, the greater the pressure.

The function according to the invention, of the proportional valve, is decisive for the safety of the marine gear and consequently for the overall safety of the ship. In the event of a failure of the electrical control current, for example as a result of cable rupture, voltage breakdown or other malfunctions, the operating pressure does not drop because the proportional valve is closed and the maximum control pressure is present at the pilot-operated pressure-reduction valve. Maximum control pressure at the pressure-reduction valve in turn leads to maximum operating pressure in the pressure-oil line leading to the multi-plate clutch. Thus slipping of the multi-plate clutch and burning of the multi-plates is prevented.

Furthermore, it is provided for the hydraulic control assembly to comprise means which make possible permanent prefilling of the pressure-oil lines to the multi-plate clutches and permanent prefilling of the multi-plate clutches themselves.

This makes it possible to prevent gear change delays when engaging the multi-plate clutch, thus ensuring dynamic control of the operating pressure depending on the change in motor speed and/or the change in the load signal of the motor.

In the known hydraulic systems, when the multi-plate clutch is disengaged, the oil-filled multi-plate clutches and the associated pressure-oil lines are entirely or partially drained of oil. When the multi-plate clutch is engaged, this so-called dead volume will first have to be filled; a process which, in particular in the case of large gears, causes gear change delays in the form of undesirable dead times. Such systems are unusable for dynamic control of the pressure during the gear change phase.

In an advantageous embodiment of the invention, the means which make possible permanent prefilling of the pressure-oil lines to the multi-plate clutches and of the multi-plate clutches themselves, comprise an orifice plate for determining the prefilling-volume stream and a pressure-control valve for setting a prefilling pressure.

Preferably, the prefilling pressure does not exceed the spring pressure present for relieving the multi-plates, with said prefilling pressure at the pressure-control valve for setting the prefilling pressure preferably being approx. 0.5 to 1 bar.

This pressure does not in itself cause pressing-on of the multi-plates because it is insufficient for overcoming the spring pressure present for relieving the multi-plates.

An improvement of the invention provides for the proportional valve and the pilot-operated pressure-control valve to be connected to the clutch connections.

This leads to improved dynamics of the control system.

It is further provided for the control oil to be able to be taken from the main flow of the hydraulic system.

This leads to a separation of control oil and gear change oil.

An advantageous embodiment of the invention provides for each multi-plate clutch to comprise a pilot-operated pressure-control valve of its own, wherein the pressure-control valves can be operated in parallel by the proportional valve.

This leads to still further improved dynamics. However, the cost of the apparatus is a disadvantage.

The pilot-operated pressure control valves are dimensioned only for the gear change oil-volume flow.

An improvement provides for the electronic control unit to be connected to sensor means, from whose measured values, together with the values for the coolant-oil volume flow and for the gear transmission, and from the geometric clutch data, it is possible to calculate the thermal load on the clutch in real time.

Preferably, the sensor means comprise sensors for detecting the motor speed, the propeller speed and the direction of rotation of the propeller, the pressure of the gear change oil in the clutch, as well as the coolant-oil temperature.

The electronic control unit calculates in real time the thermal load on the clutch from the following parameters: the motor speed, the speed and direction of rotation of the propeller, the pressure of the gear change oil in the clutch, the coolant-oil temperature, the coolant-oil volume flow, the gear transmission, and the geometric clutch data.

The motor speed, the speed and direction of rotation of the propeller, and the gear transmission are used as a basis for calculating the differential rotational speed f(t) between the inner multi-plates and the outer multi-plates of the clutch. The gear-change oil pressure f(t) causes the surface pressure f(t) on the multi-plate packet. Surface pressure and differential rotational speed are used to calculate friction capacity and friction work over the slipping time. The friction work carried out so far is known at any given point in time of the slipping phase and is compared with the permissible value. The permissible value is not a fixed quantity, but instead it depends on the coolant-oil temperature, the coolant-oil volume flow, the geometric clutch data and previous gear change processes undertaken. The coolant-oil volume flow can be acquired by way of a sensor or it can be input in relation to the gear, as a parameter, via software. Gear transmission and geometric clutch data are also input via software, that is to say the data record is selected.

In theory, situations are imaginable where unacceptable levels of friction heat may be generated, e.g. during a crash-stop manoeuvre at relatively high motor speed.

If, for example, 80% of the permissible thermal load is reached, a preliminary alarm can be triggered by way of an alarm system connected to the electronic control unit. In the case of 100% thermal load, optionally, a main alarm is triggered and the clutch is engaged or disengaged.

Furthermore, the invention relates to a method for preventing a drop in motor speed when engaging the multi-plate clutch of the marine gear according to the invention.

The method according to the invention is characterised in that every time the multi-plate clutch is engaged, the operating pressure is built up in such a way, depending on the change in motor speed and/or the change in the load signal of the motor over time, that said operating pressure counteracts a change in motor speed and/or a change in the load signal of the motor.

Preferably, the electronic control unit counteracts a change in motor speed and/or change in the load signal of the motor, measured during engagement of the clutch, by issuing electrical control signals, depending on the changes measured, to the control means for setting the operating pressure; in this way causing a change in the degree of slip of the multi-plate clutch.

Motor speed and/or load signal of the motor are used as input quantities for the electronic control unit. Preferably, the electronic control unit processes different load signals, e.g. CAN bus, 4–20 mA, 0–200 mA.

Input is parameterised via software according to the connected signal.

During engagement of the multi-plate clutch, the control unit processes the changes in motor speed and/or load signal of the motor and regulates the electrical control current to the proportional valve such that the resulting change in pressure influences the transmittable torque of the multi-plate clutch to the extent that the change in motor speed or change in load signal is counteracted.

In this way the strong drop in motor speed which is usual with some motors, is avoided. If gear change times are optimal, peaks in gear change moment are reduced.

Depending on the output of the diesel motor in the partial load range and depending on the respective gear change manoeuvre at low speed of the ship or during a crash stop, slipping times and friction heat occur which differ in duration and intensity respectively.

All the required control parameters are set via software.

If, according to the invention, the respective change in motor speed and/or change in the load signal of the motor is incorporated in the clutch process during establishment of the pressure-build-up curve and during engagement of the clutch, then engagement of the clutch advantageously is much more gentle and sometimes also faster than is the case in the state of the art.

In the case of the invention, the motor practically always just has to produce (in other words engaging the clutch is such that there is just) as much power as is required as a maximum output in partial load operation. Thus the pressure build-up curve, and therefore the process of engaging the clutch, is automatically matched to the particular external parameters and circumstances prevailing at the time. For this reason, the gear assembly according to the invention can be referred to as an "intelligent gear arrangement".

The electronic control unit calculates the friction heat in the multi-plate packet during the engagement phase, thus monitoring the thermal load on the multi-plate clutch.

BRIEF DESCRIPTION OF THE DRAWINGS

Below, the invention is explained by means of exemplary embodiments which are shown in the drawing. The following are shown.

DETAILED DESCRIPTION OF THE INVENTION

Figure 1:
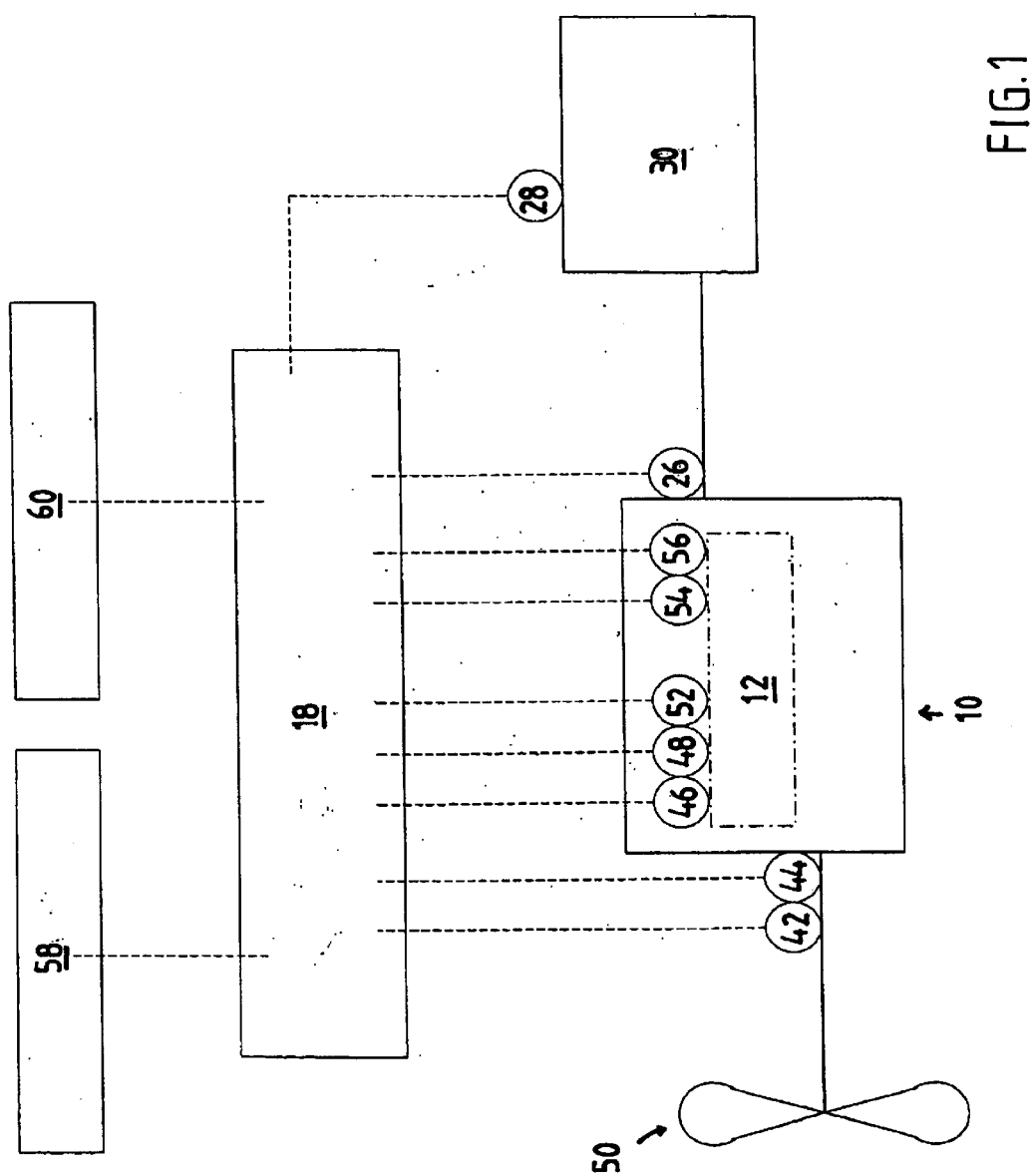
FIG. 1 a diagrammatic general plan of the marine gear according to the invention.

FIG. 1 shows a diagrammatic general plan of the marine gear 10 according to the invention.

The marine gear 10 comprises a hydraulic control assembly 12 with variable multi-plate clutches (not shown) for forward and reverse travel, and an electronic control unit 18.

The hydraulic control assembly 12 comprises a clutch relay valve (not shown), which can be electrically operated by the electronic control unit 18, for engaging the forward and reverse clutch. To this effect, the electronic control unit 18 issues control signals 54 for actuating the clutch relay valve to the operating position "forward" or control signals 56 for actuating the clutch relay valve to the operating position "reverse".

The electronic control unit 18 is connected to a sensor for detecting the motor speed 26 and to a sensor for detecting the load signal 28 of the motor 30.

The operating pressure required to engage the multi-plate clutches can be set by way of a control means which can be operated by the electronic control unit 18 by way of an electrical control current 52.

Moreover, the electronic control unit 18 comprises sensor means whose measured variable can be used in real time for calculating the thermal clutch load. The sensor means comprise sensors for detecting the motor speed 26, the propeller speed 42 and the direction of rotation 44 of the propeller, the gear change-oil pressure 46 in the multi-plate clutch, and the coolant-oil temperature 48.

The electronic control unit 18 monitors the thermal load of the multi-plate clutch during the gear change process. If the thermal load becomes excessive, an alarm is triggered by way of an alarm system 58 which is connected to the electronic control unit 18. Advantageously, the electronic control unit 18 can be operated by remote control 60.

The hydraulic control assembly for marine gear, shown in FIGS. 2 to 5, comprises a pump 62 for generating the hydraulic energy, a filter 64 for cleaning the hydraulic fluid, an oil cooler 66 for leading away the dissipation heat, and a clutch relay valve 68 for selecting between "forward" and "reverse" travel. A multi-plate clutch 14 for forward travel and a multi-plate clutch 16 for reverse travel are hydraulically connected to the clutch relay valve 68.

The clutch relay valve 68 is a 3-way valve which can be electrically actuated by way of the control unit (not shown) of the marine gear according to the invention.

According to the invention, the hydraulic control assembly comprises a combination of at least one pilot-operated pressure-control valve 24 and an proportional valve 20, the latter being able to be electrically actuated.

The multi-plate clutch 14, 16 comprises several multi-plate discs, a first number of which engages the drive shaft of the motor, and a second number engages the drive shaft or driven shaft of the propeller.

In order to close the multi-plate clutch 14, 16, the multi-plate discs are pressed against each other by clutch oil pressure which can be set by means of the controllable pressure-control valve 24. The clutch oil pressure is also called gear change pressure or operating pressure.

In the case of conventional hydraulic control assemblies, in the neutral position of the clutch relay valve 68, the multi-plate clutches 14, 16 and the associated pressure-oil lines can entirely or partially run without load, by way of the connection A-T or B-T.

At each gear change procedure, this dead volume has to be filled up again, a process which in particular in the case of large gears results in gear change delays in the form of undesirable dead times. Such systems are therefore unsuitable for dynamic control of the operating pressure during the gear change phase.

In order to prevent this, the hydraulic control assembly 12 comprises an orifice plate 32 and a pressure-control valve 34. Together they ensure permanent prefilling of the pressure-oil lines to the multi-plate clutches 14, 16, and to the multi-plate clutches 14, 16 themselves.

Prefilling pressure is set at the pressure-control valve 34. Prefilling pressure does not exceed the spring pressure caused by the readjusting spring 36 (of which there is at least one) for relieving the multi-plate discs. Preferably, the prefilling pressure is 0.5 to 1 bar.

Figure 2:
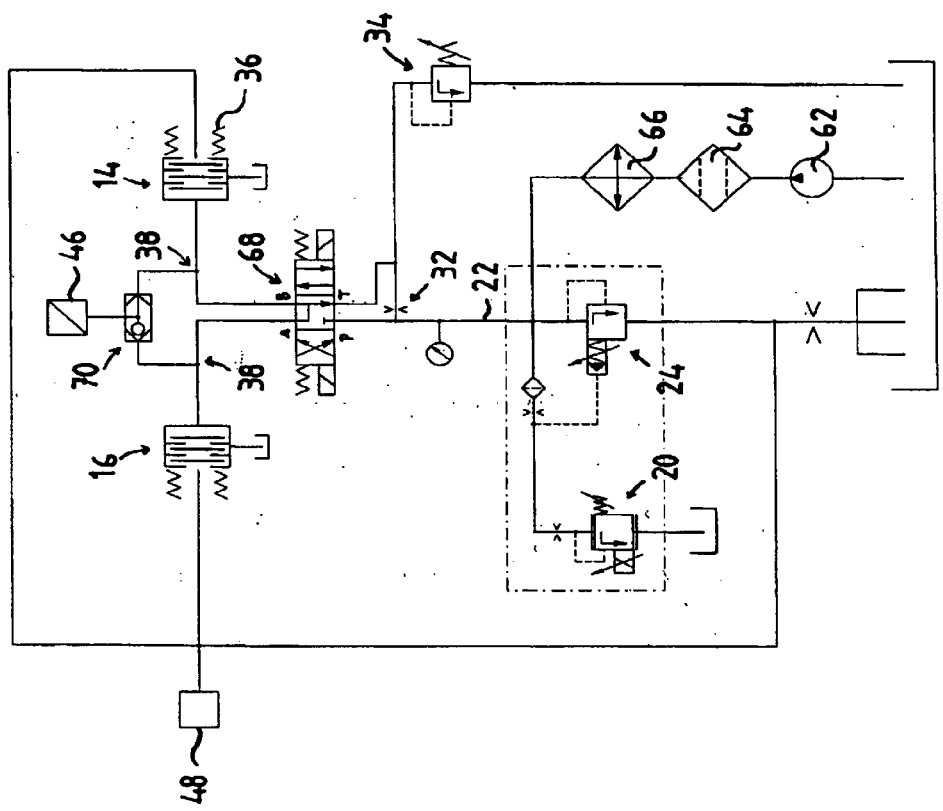
FIG. 2 a first embodiment of the hydraulic control assembly according to the invention.

In FIG. 2, the combination comprising at least one pilot-operated pressure-control valve 24 and a proportional valve 20 which can be actuated electrically, is connected to pressure-oil line 22 which leads to the clutch relay valve.

This arrangement is associated with a disadvantage in that the operating pressure which can be set at the pressure reduction valve 24, does not correspond exactly to the operating pressure present at the multi-plate clutch 14, 16, or that said operating pressure is built up with a short delay in time.

Figure 3:
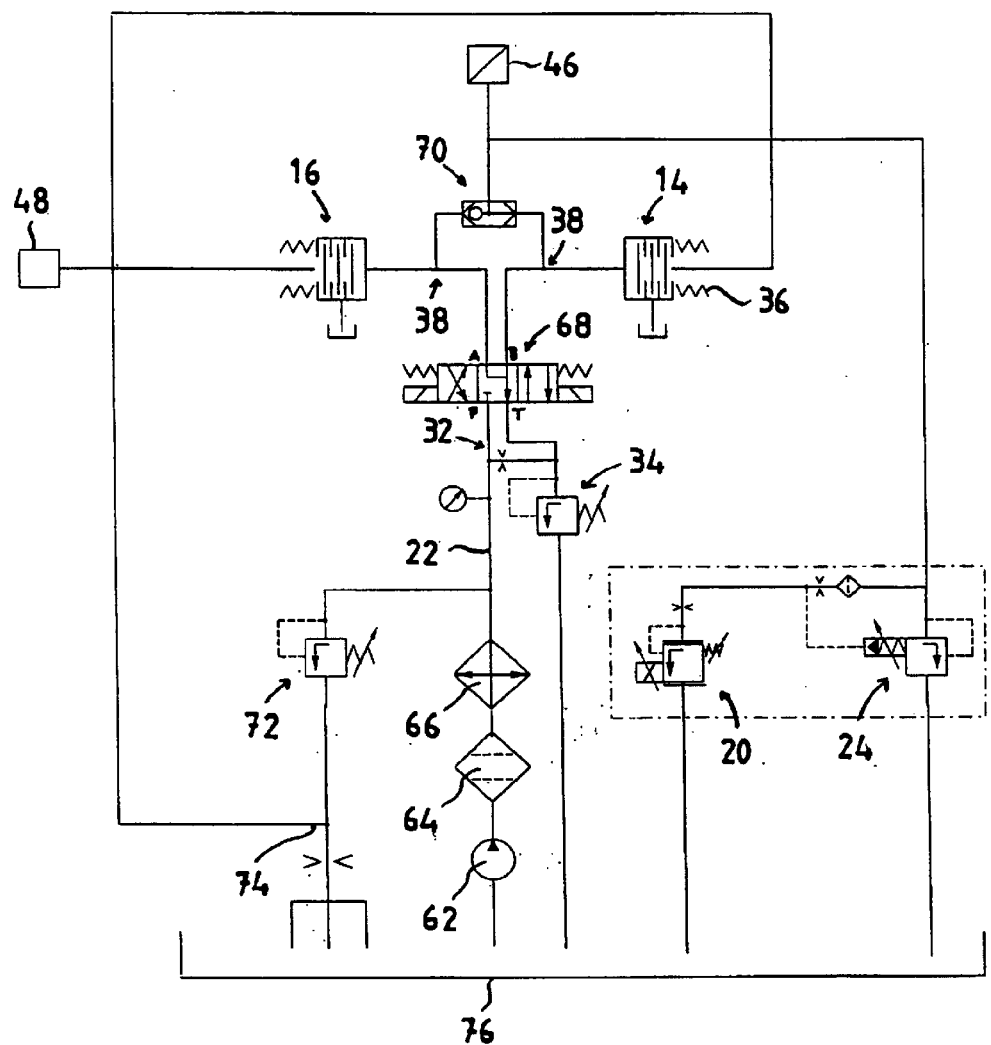
FIG. 3 a second embodiment of the hydraulic control assembly according to the invention.

FIG. 3 therefore shows an improvement in which the valve combination according to the invention, comprising a proportional valve 20 and a pilot-operated pressure-control valve 24, is directly connected to the clutch connections 38. In this arrangement, the valve combination is connected to the two multi-plate clutches 14, 16 by way of a shuttle valve 70.

With this variant, the dynamics of the control system are still further improved.

In order to set the operating pressure in neutral position of the clutch relay valve 68, a pressure-control valve 72 has been inserted in the main oil flow of the pressure-oil line 22.

In this arrangement, the pilot-operated pressure-control valve 24 only has to be designed to cope with the gear change-oil volume flow.

Figure 4:
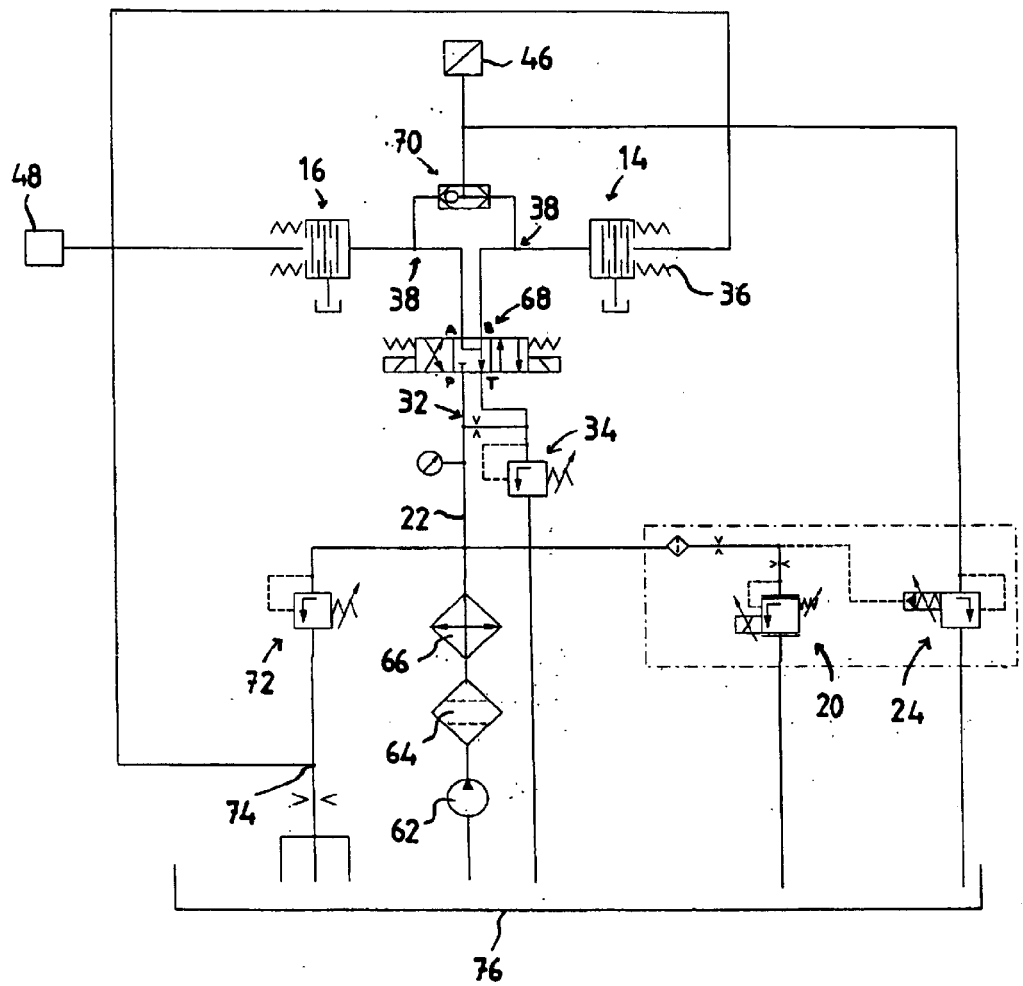
FIG. 4 a third embodiment of the hydraulic control assembly according to the invention.
Figure 5:
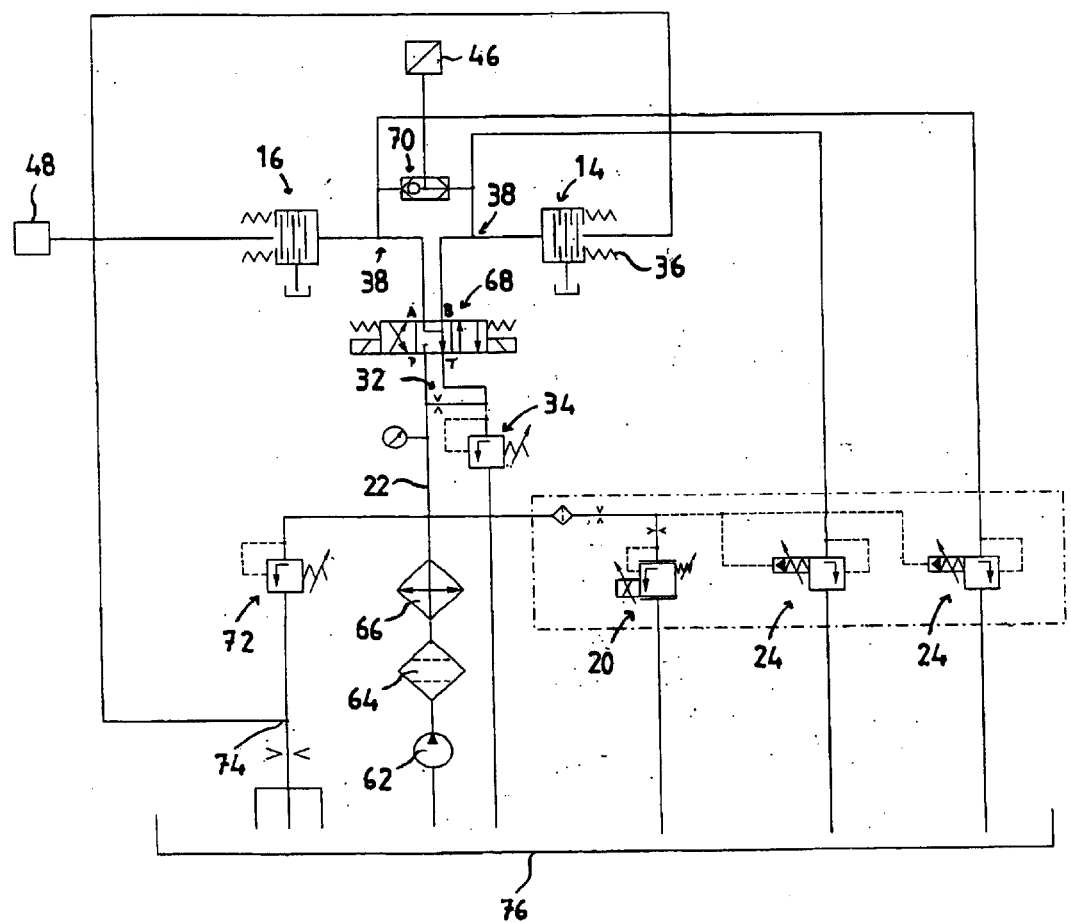
FIG. 5 a fourth embodiment of the hydraulic control assembly according to the invention.

FIGS. 4 and 5 show two further variants of the arrangement of the valve combination comprising a proportional valve 20 and a pilot-operated pressure-control valve 24.

The arrangement shown in FIG. 4 differs from that in FIG. 3 in that the control oil is taken from the main flow of the hydraulic system. Control oil and gear change oil are thus separated.

According to FIG. 5, each multi-plate clutch has a pilot-operated pressure-control valve 24 of its own. Both pressure-control valves 24 are operated in parallel by the proportional valve 20.

The pilot-operated pressure-control valves 24 shown in FIG. 5 only need to be designed to cope with the gear change-oil volume flow.

As shown in FIGS. 3 to 5, the oil which during a gear change procedure flows through the pilot-operated pressure-control valve 24, flows directly back into the gear oil sump 76. However, it is also possible to feed the oil, which flows back by way of the pilot-operated pressure-control valve 24, directly into the lubricant-coolant oil pipe 74.

Figure 6:
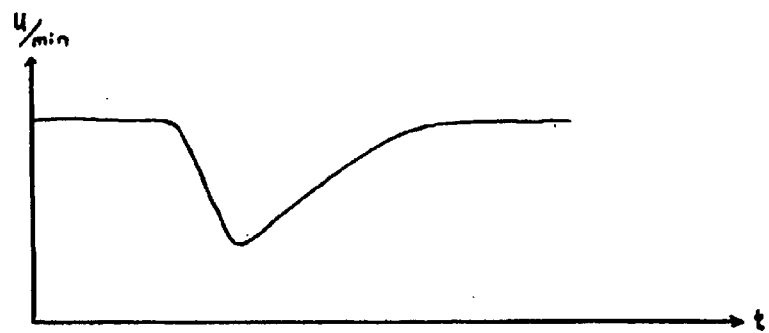
FIG. 6 a change in the motor speed when engaging the multi-plate clutch of conventional marine gear assemblies, and of marine gear assemblies according to the invention.
Figure 6:
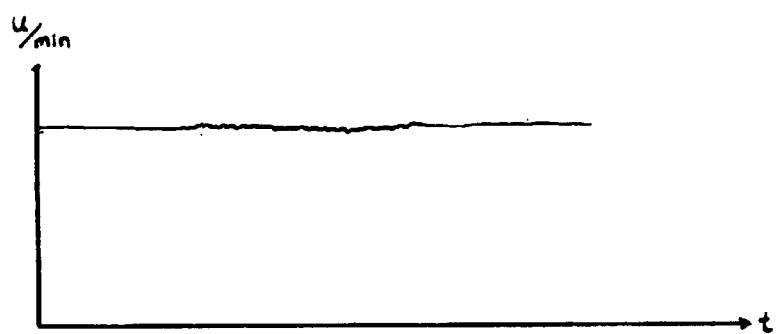

FIG. 6 shows a change in motor speed when engaging the multi-plate clutch of conventional marine gears and of marine gears according to the invention.

The upper diagram shown in FIG. 6 shows the drop in motor speed experienced during engagement of conventional variable multi-plate clutches.

The lower diagram shown in FIG. 6 shows the comparatively constant motor speed experienced during engagement of the multi-plate clutch according to the method according to the invention.

What is claimed is:

1. A method for preventing a drop in motor speed when engaging multi-plate clutch of a marine reversing gear comprising the following steps:

engaging said multi-plate clutch by building up a control pressure depending on a change in the speed of the motor or a change in a load signal of said motor so that an operating pressure counteracts a change in motor speed or a change in the load signal of said motor.

2. The method according to claim 1, further comprising the step of counteracting a change in speed or change in said load signal of said motor, by using said electronic control unit wherein said change is measured during engagement of said multi-plate clutch so that, depending on said measured changes, said electronic control unit issues electrical control signals to said control means for setting said gear change pressure, resulting in a change of the degree of slip of the multi-plate clutch.

3. The method according to claim 1, further comprising the step of monitoring a thermal load on said multi-plate clutch by using said electronic control unit.

4. A marine reversing gear comprising:
   a) a hydraulic control assembly including at least one pressure control line;
   b) a plurality of multi-plate clutches coupled to said at least one pressure control line;
   c) a control means coupled to said at least one pressure control line and in hydraulic communication with said multi-plate clutches comprising:
      i) at least one proportional valve;
      ii) at least one pilot operated pressure-control valve, which can be operated by said at last one proportional valve to release a return flow of oil, and wherein said pressure control valve is coupled to said at least one pressure control line;
   d) at least one sensor coupled to said at least one pressure control line for detecting at least one parameter; and
   e) a control unit in communication with said sensor, for receiving signals from said sensor and relaying said signals to said control means to control a hydraulic pressure in said hydraulic control assembly to prevent a drop in speed when a motor engages at least one of said plurality of multi-plate clutches.

5. The marine reversing gear according to claim 4, wherein said hydraulic control assembly further comprises means for permanent prefilling of said pressure-oil lines to said multi-plate clutches and for permanent prefilling of the multi-plate clutches.

6. The marine reversing gear according to claim 5, wherein said means for prefilling comprises an orifice plate for determining a prefilling-volume stream, and a pressure-control valve for setting a prefilling pressure.

7. The marine reversing gear according to claim 5, further comprising at least one readjusting spring wherein said means for prefilling is set so that a prefilling pressure does not exceed a spring pressure which is present for relieving the multi plates, said spring pressure being exerted by said at least one readjusting spring.

8. The marine reversing gear according to claim 4, wherein said proportional valve and said pilot-operated pressure-control valve are connected to said clutch connections.

9. The marine reversing gear according to claim 4, wherein said control oil can be taken from a main flow of said hydraulic control assembly.

10. The marine reversing gear according to claim 4, wherein multi-plate clutch comprises a pilot-operated pressure-control valve of its own, wherein said pressure-control valves can be operated in parallel by said proportional valve.

11. The marine reversing gear according to claim 4, wherein electronic control unit is connected to sensor means whose measured values can be used in real time for calculating said thermal load on the clutch.

12. The marine reversing gear according to claim 11, wherein said sensor means comprises sensors for detecting said motor speed, said propeller speed and the said direction of rotation of the propeller, the pressure of the gear change oil in the multi plate clutch, as well as the coolant-oil temperature.

13. The gear as in claim 4, wherein said at least one sensor is for detecting a motor speed of a motor coupled to the marine gear.

14. The gear as in claim 4, wherein said at least one sensor is for detecting a load signal of a motor coupled to the marine gear.

15. A marine reversing gear comprising:
   a) a hydraulic control assembly including at least one pressure control line;
   b) a plurality of multi plate clutches coupled to said at least one pressure control line;
   c) a control means coupled to said at least one pressure control line and in hydraulic communication with said multi-plate clutches comprising:
      i) at least one proportional valve;
      ii) at least one pilot operated pressure-control valve which can be operated by said at least one proportional valve and coupled to said at least one pressure control line;
   d) at least one sensor coupled to said at least one pressure control line for detecting at least one parameter; and
   e) a control unit in communication with said at least one sensor, for receiving signals from said at least one sensor and relaying said signals to said control means to control a hydraulic pressure in said hydraulic control assembly wherein said at least one proportional valve generates a hydraulic control pressure which is inversely proportional to the electrical control current to prevent a drop in speed when a motor engages at least one of said plurality of multi-plate clutches.

* * * * *